(12) United States Patent
King

(10) Patent No.: US 9,292,066 B2
(45) Date of Patent: Mar. 22, 2016

(54) CONFIGURING CABLE LINES TO PROVIDE DATA AND POWER

(75) Inventor: Benjamin John King, Dallas, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1386 days.

(21) Appl. No.: 12/771,955

(22) Filed: Apr. 30, 2010

(65) Prior Publication Data

US 2011/0271122 A1   Nov. 3, 2011

(51) Int. Cl.
*G06F 1/26* (2006.01)

(52) U.S. Cl.
CPC ........ *G06F 1/266* (2013.01); *G06F 2213/0038* (2013.01)

(58) Field of Classification Search
CPC ............. G06F 1/18; G06F 1/26; G06F 1/266; G06F 1/32; G06F 13/00; G06F 13/40; G06F 13/42; G06F 2213/0038
USPC ............... 710/2, 8, 10, 14–16, 100, 300–302, 710/105–106; 713/300, 310, 340
See application file for complete search history.

(56) References Cited

U.S. PATENT DOCUMENTS

| 2006/0015757 | A1  | 1/2006  | Tupman et al. |
| 2008/0303486 | A1* | 12/2008 | Kao et al. ........................ 320/139 |
| 2009/0082910 | A1  | 3/2009  | Sato |
| 2010/0127864 | A1* | 5/2010  | Veselic ........................ 340/540 |
| 2010/0201308 | A1* | 8/2010  | Lindholm ...................... 320/107 |
| 2010/0205463 | A1* | 8/2010  | Magnusson ................... 713/300 |
| 2010/0219790 | A1* | 9/2010  | Chadbourne et al. ......... 320/107 |
| 2010/0275001 | A1* | 10/2010 | Yoshioka et al. ................ 713/2 |
| 2011/0057604 | A1* | 3/2011  | Capella ......................... 320/107 |

FOREIGN PATENT DOCUMENTS

| EP | 1158593 A1     | 11/2001 |
| EP | 1950665 A1     | 7/2008  |
| WO | 2007084428 A2  | 7/2007  |

OTHER PUBLICATIONS

European Search and Examination Report; EP Application No. 10161683.7; Jul. 21, 2010; 6 pgs.
Fischer, Daniel M.; U.S. Appl. No. 12/714,204; Title "Multifunctional Charger System and Method"; Filing Date: Feb. 26, 2010; Specification 29 pages; 4 Drawing Sheets (Figs. 1-4).
Canadian Office Action; Application No. 2,738,532; Jun. 15, 2012; 2 pages.
Canadian Office Action; Application No. 2,738,532; Nov. 17, 2014; 4 pages.
European Examination Report; Application No. 10161683.7; Jul. 17, 2013; 6 pages.
Canadian Office Action; Application No. 2,738,532; Aug. 19, 2013; 3 pages.

* cited by examiner

*Primary Examiner* — Thomas J Cleary
(74) *Attorney, Agent, or Firm* — Conley Rose, P.C.; J. Robert Brown, Jr.

(57) ABSTRACT

A method is provided for an upstream device to configure a plurality of lines in a cable. The method comprises the upstream device placing a first voltage on a first one of the lines traditionally specified to supply power; the upstream device grounding a second one of the lines traditionally specified to be a ground line; and the upstream device placing on a third one of the lines traditionally specified to convey data a second voltage for supplying power.

42 Claims, 6 Drawing Sheets

| PIN NUMBER | DESCRIPTION |
|---|---|
| 1 | +5V |
| 2 | D- |
| 3 | D+ |
| 4 | ground |

Figure 1a (prior art)

| PIN NUMBER | DESCRIPTION |
|---|---|
| 1 | +5V |
| 2 | +5V |
| 3 | +5V |
| 4 | ground |

Figure 1b

| PIN NUMBER | DESCRIPTION |
|---|---|
| 1 | +5V |
| 2 | +3.3V |
| 3 | +2.5V |
| 4 | ground |

Figure 1c

| PIN NUMBER | DESCRIPTION |
|---|---|
| 1 | +5V |
| 2 | +5V |
| 3 | ground |
| 4 | ground |

Figure 1d

| PIN NUMBER | DESCRIPTION |
|---|---|
| 1 | +5V |
| 2 | -5V |
| 3 | -10V |
| 4 | ground |

Figure 1e

| PIN NUMBER | DESCRIPTION |
|---|---|
| 1 | +5V |
| 2 | -5V |
| 3 | D+ |
| 4 | ground |

Figure 1f

CONFIGURING CABLE LINES TO PROVIDE DATA AND POWER

BACKGROUND

A USB (Universal Serial Bus) cable can provide an interface between a host device and one or more peripheral devices, such as mobile telephones, personal digital assistants, personal media players, cameras, printers, keyboards, mice, and removable media drives. Such peripheral devices may be also referred to as slave devices or downstream devices. The host device, which may also be referred to as a master device or an upstream device, is typically a computer system such as a personal computer. Alternatively, the host device could be an adapter that can plug into a wall outlet and provide power to a peripheral device.

USB permits electronic devices to be attached to each other, automatically configured upon detection of their attachment, and detached from each other while still in operation. In other words, USB provides "hot-plugging" support that includes automatic configuration. The automatic configuration might include a handshaking procedure in which the host device determines the speed and device class of the peripheral device. The host device might then load an appropriate device driver based on the class of the peripheral device.

A USB cable complying with USB standards 2.0 and lower comprises four conductors: two power lines (High and Ground) and two data lines (D+ and D−). USB standard 3.0 includes four additional SuperSpeed data lines. FIG. 1a illustrates the configuration of the lines in a USB standard 2.0-compliant cable. As shown, pin 1 of such a cable is a +5 volt line, pin 2 is the D− line, pin 3 is the D+ line, and pin 4 is the ground line. In any of the USB standards, the power that can be delivered to a peripheral device over a USB cable might be limited by the voltage and current capacity of the two power lines.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 illustrates various possibilities for data and power on a USB-type cable, according to an embodiment of the disclosure.

DETAILED DESCRIPTION

Figure 2:
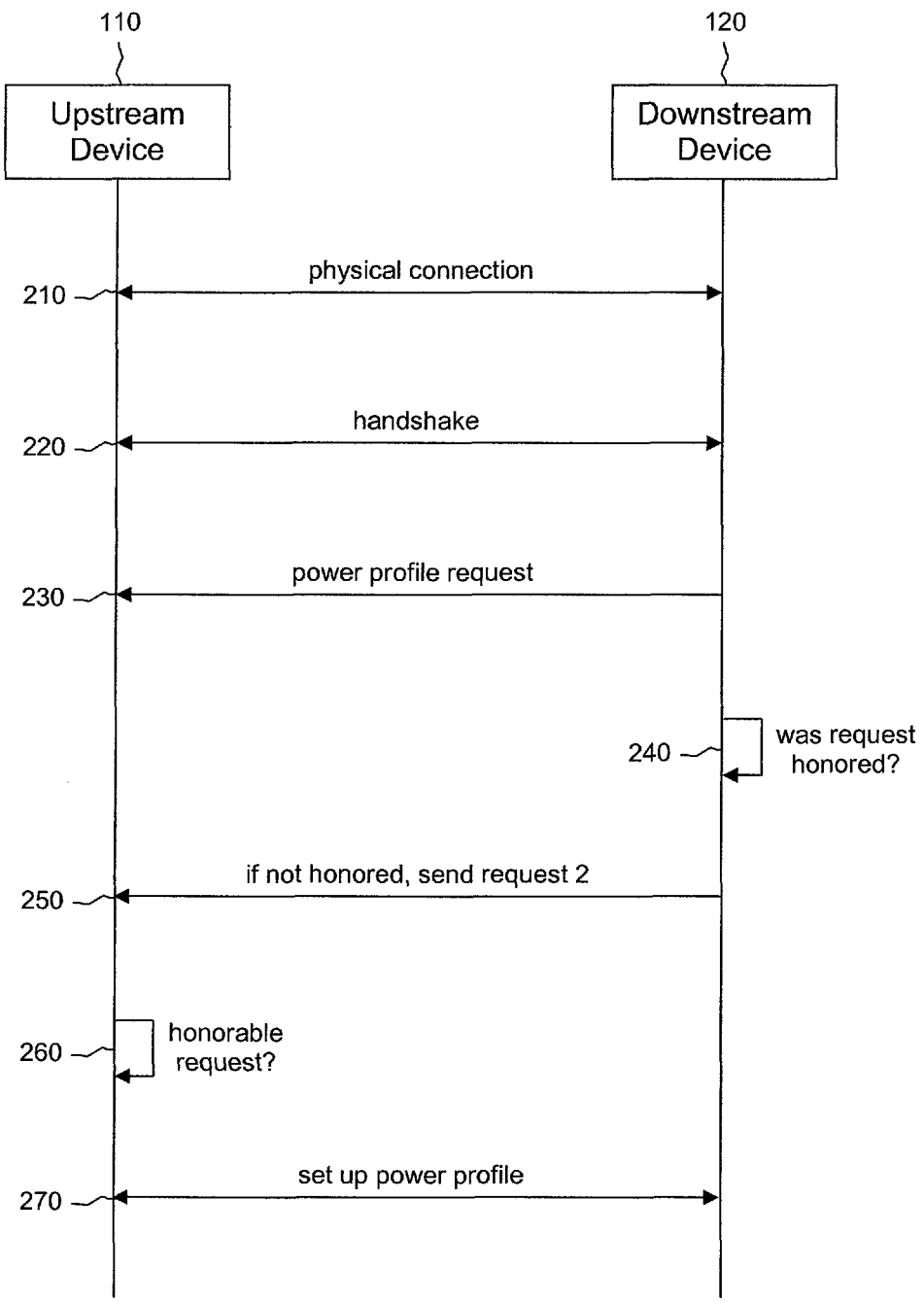
FIG. 2 illustrates a sequence diagram for a downstream device requesting power on a data line, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some downstream devices may have unique and/or changing power requirements that would benefit from a power supply different from or in addition to the +5 volt power provided over traditional USB cables. Embodiments of the present disclosure provide for dynamically configuring whether the lines of a USB-type cable carry data, power, or both. For example, one line could be statically configured for power, one line could be statically configured for ground, and the remaining lines could be dynamically configured for data, power, or both.

As used herein, the terms "USB-type cable", "USB-type lines", and the like refer to cables, lines, and related components that comply with the form factors of the USB standards but that do not necessarily comply with the USB standards regarding whether data or power is carried on a conductor. Also, as used herein the term "power" refers to electrical energy that is primarily intended to supply energy to a component, while the term "data" refers to electrical energy that is primarily intended to convey information. In addition, as used herein, the terms "traditional", "traditionally", and the like refer to cables, lines, and related components as specified in the USB standards. Furthermore, while the discussion herein focuses on USB and USB-type cables, the embodiments described herein could apply to other types of cables and connections.

More specifically, embodiments of the present disclosure provide methods and mechanisms for using the traditional USB data lines (D+ and D−) in addition to the traditional USB power lines to provide power to a downstream device after a handshaking procedure with an upstream device. For example, the High power line might provide up to 200 milliamps (ma) at 5 volts in accordance with USB standards, and then after the handshake, D+ and/or D− might also be set to provide up to 200 ma at 5 volts. In another example, the downstream device may comprise circuits that use power at 5 volts, other circuits that utilize power at 3.3 volts, and further circuits that utilize power at 2.5 volts, and power could be provided at all three voltages. For instance, High could be set to provide power at 5 volts and, after the handshake, D+ could be set to provide power at 3.3 volts, and D− could be set to provide power at 2.5 volts. In other embodiments, other voltages could be used on D+ and D−.

In some cases, the downstream device may have separate circuits that would benefit from separate power sources. In an embodiment, separate charging circuits could be provided by using D+ and D− as separate power supply lines. For example, the traditional High and the traditional Ground could be used to power one circuit of the downstream device and the traditional D+ and the traditional D− could be used to power a second circuit of the downstream device (i.e., D+ could act as a second High and D− could act as a second Ground).

Some downstream devices may require large voltages. In an embodiment, large voltages could be provided by providing negative voltages on D+ and/or D−. That is, D+ and/or D− have a negative polarity, while High has a positive polarity. For example, High could be set to provide positive 5 volts and the traditional D+ could be set to provide negative 5 volts such that the downstream device would see a difference of 10 volts between High and D+. In such cases, the traditional D− might be set to provide the same negative voltage as D+ or a different negative voltage from that on D+. Alternatively, D− might be set to provide data.

FIGS. 1b-1f illustrate examples of configurations of lines in a USB-type cable according to the embodiments of the present disclosure. It should be understood that the configurations shown in FIGS. 1b-1f are provided for illustrative purposes only and that in other embodiments other voltages could be provided. Also, the voltages could be provided on pins other than those shown. For example, where pin 2 is shown as +5 volts and pin 3 is shown as Ground, in other embodiments, pin 3 could be +5 volts and pin 2 could be Ground. In addition, these examples apply to a USB-type cable that conforms to USB 2.0 and earlier form factors, but it should be understood that similar principles could apply to cables conforming to USB standards later than 2.0. Furthermore, only the voltages are shown on the lines that provide power, but it should be understood that power might be supplied at various levels of current for any voltage.

FIG. 1b illustrates one embodiment of a possible configuration of the lines in a USB-type cable. In this embodiment, pins 1, 2, and 3 are all +5 volts, and pin 4 is ground. This configuration might be used to provide a downstream device with three different 5 volt circuits that share a common ground. In FIG. 1c, pin 1 is +5 volts, pin 2 is +3.3 volts, pin 3 is +2.5 volts, and pin 4 is ground. In other embodiments, other voltages could be present on pins 2 and 3. This configuration might be used to provide a downstream device with three different circuits, each using a different voltage. In FIG. 1d, pin 1 and pin 2 are both +5 volts, and pin 3 and pin 4 are both ground. This configuration might be used to provide a downstream device with two separate circuits, each having its own ground.

FIGS. 1e and 1f illustrate configurations where a voltage greater than 5 volts may be needed by a downstream device. In both of these examples, pin 1 is +5 volts and pin 2 is −5 volts, and therefore a voltage of 10 volts can be obtained between pins 1 and 2. In FIG. 1e, pin 3 is −10 volts, and therefore a voltage of 15 volts can be obtained between pins 1 and 3. In FIG. 1f, pin 3 is used for data.

In an embodiment, a downstream device can control the settings of the power delivered by an upstream device. As an example, after the handshake, the downstream device may request a unique power setting from the upstream device by sending a request via one or both of the traditional USB data lines (D+ or D−). After receiving the request, and if the upstream device can handle the request (e.g., the downstream device is not asking for voltages or currents outside of the upstream device's capability), the upstream device reconfigures the settings of the USB lines (any of High, Ground, D+, and D−) in accordance with the downstream device's request.

For example, the downstream device might communicate a power request via the D− line and request that the High and D+ lines be set to provide up to 300 ma at 5 volts. If this voltage and this current are beyond the capability of the upstream device, the upstream device does not honor the request. After detecting that the power request was not honored, the downstream device may then send a different request, e.g., that the High and D+ lines be set to provide up to 200 ma at 5 volts. If this voltage and this current are within the capability of the upstream device, the upstream device provides power at the requested voltage and current levels. Hence, the upstream device may provide unique power output based on a request from the downstream device. If the upstream device is not capable of understanding the request from the downstream device to place a voltage on a traditional data line, or if the upstream device is capable of understanding the request but is not capable of placing a voltage on a traditional data line, then the request is ignored and data communication may occur on the D+ and D− lines according to the USB standards.

FIG. 2 is a sequence diagram that illustrates this embodiment. At event 210, an upstream device 110 and a downstream device 120 are physically connected via a USB-type cable. At event 220, a standard USB handshake occurs. At event 230, the downstream device 120 sends a power profile request to the upstream device 110. For example, the downstream device 120 might request that the upstream device 110 provide power on D+ and/or D−. At event 240, the downstream device 120 determines whether the request was honored. If the request was not honored, the downstream device 120, at event 250, might send a second power profile request. The second power profile request might, for example, ask for a lower current capability than the first request. At event 260, the upstream device 110 determines that the request can be honored. At event 270, the upstream device 110 provides the downstream device 120 with power with the requested power profile. Alternatively, the upstream device 110 might provide the downstream device 120 with power that does not exactly conform to, but is reasonably close to, the requested power profile.

Figure 3:
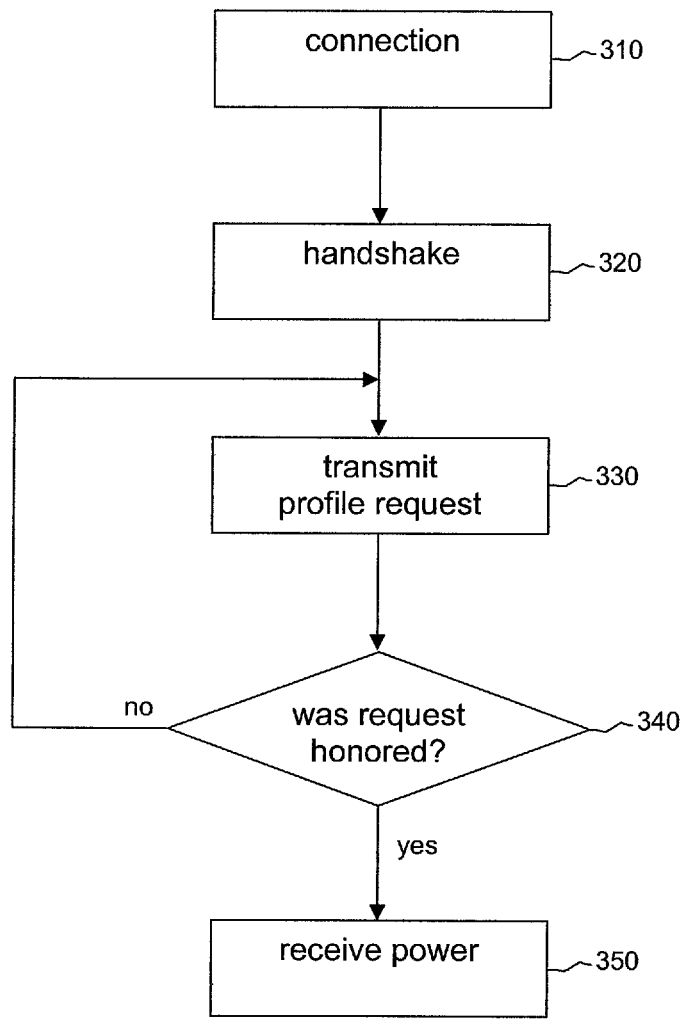
FIG. 3 illustrates a flowchart for a downstream device requesting power on a data line, according to an embodiment of the disclosure.

FIG. 3 is a flowchart that illustrates this embodiment from the perspective of a downstream device. At block 310, a physical connection is made between the downstream device and an upstream device via a USB-type cable. At block 320, a standard USB handshake occurs between the upstream device and the downstream device. At block 330, the downstream device transmits a power profile request to the upstream device. At block 340, the downstream device determines whether the request was honored. If the request was not honored, the flow might return to block 330, and the downstream device might send another power profile request. If the request was honored, the downstream device, at block 350, receives power with the requested power profile.

Figure 4:
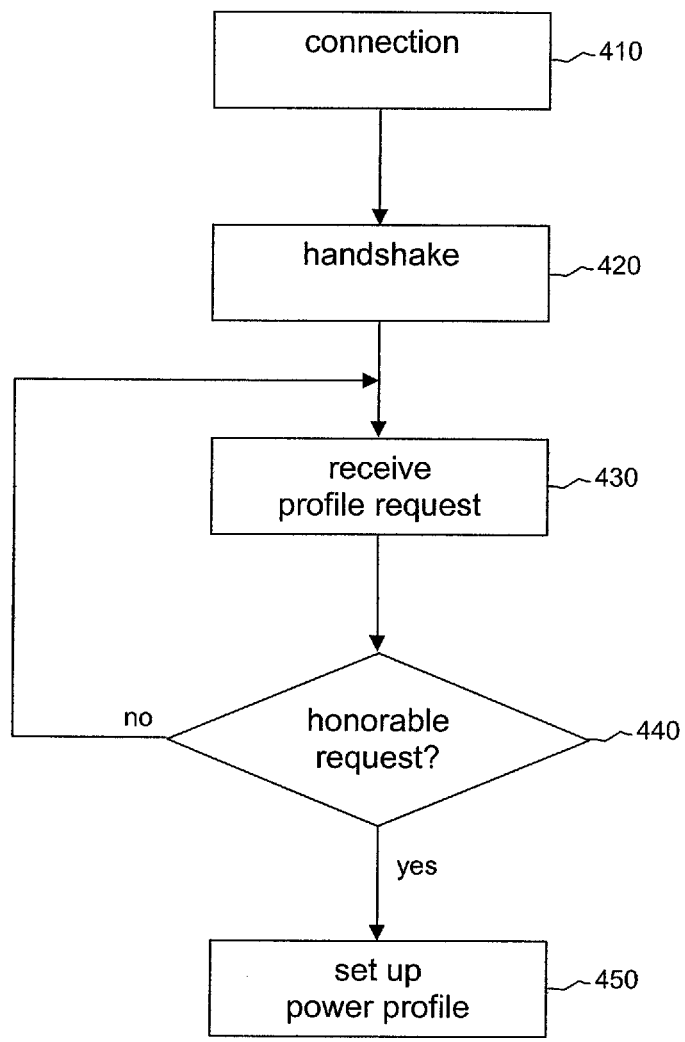
FIG. 4 illustrates a flowchart for an upstream device receiving a request for power on a data line, according to an embodiment of the disclosure.

FIG. 4 is a flowchart that illustrates this embodiment from the perspective of an upstream device. At block 410, a physical connection is made between the upstream device and a downstream device via a USB-type cable. At block 420, a standard USB handshake occurs between the upstream device and the downstream device. At block 430, the upstream device receives a power profile request from the downstream device. At block 440, the upstream device determines whether the request can be honored. If the request cannot be honored, the flow might return to block 430, and the upstream device might receive another power profile request from the downstream device. If the request can be honored, the upstream device, at block 450, sets up a power profile that conforms with the power profile requested by the downstream device. If the upstream device cannot provide the downstream device with power that exactly conforms to the requested power profile, the upstream device might provide power that is reasonably close to the requested power profile.

In an alternative embodiment, after the handshake, the upstream device provides the downstream device with options for the voltages and currents that the upstream device can provide on the traditional data lines (that is, on D+ and D− or on pins 2 and 3). The options might be provided in the form of a menu of specific voltage and current combinations that the upstream device can provide, and the downstream device might select one of the menu items. Alternatively, the options might be provided in the form of a set of ranges of voltages and currents that the upstream device can provide, and the downstream device might select a voltage and a current that fall within the ranges. In other embodiments, the options might be provided in other forms.

After receiving the options, the downstream device might select a desired voltage and current for one or more of the traditional data lines and inform the upstream device of the selection. The upstream device might then provide power on the traditional data lines at the selected voltage and current levels. If the downstream device is not capable of understanding the offer of the options, or if the downstream device is capable of understanding the offer but does not wish to have a voltage placed on a traditional data line, then the offer is ignored and data communication may occur on the D+ and D− lines according to the USB standards.

Figure 5:
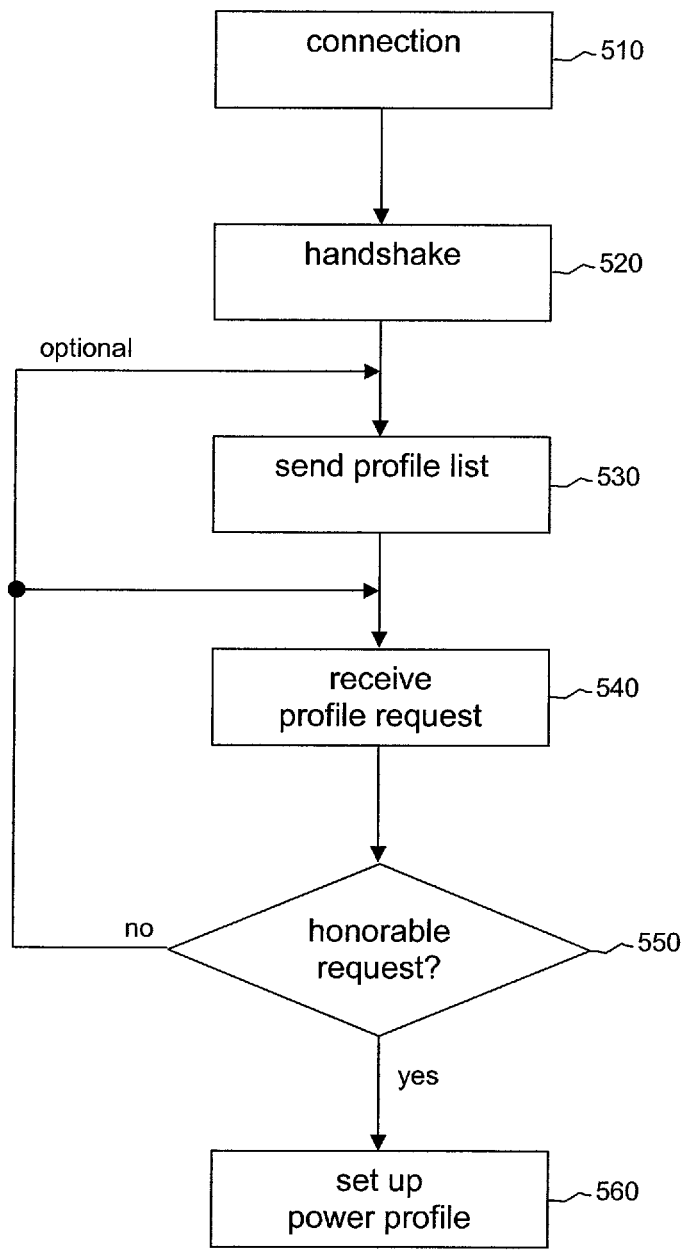
FIG. 5 illustrates a flowchart for an upstream device providing options to a downstream device for power on a data line, according to an embodiment of the disclosure.

FIG. 5 is a flowchart that illustrates this embodiment. At block 510, a physical connection is made between an upstream device and a downstream device via a USB-type cable. At block 520, a standard USB handshake occurs between the upstream device and the downstream device. At block 530, the upstream device sends a power profile list to the downstream device. For example, the upstream device might transmit a menu, list, table, or ranges of voltages and currents that it can provide on a traditional data line. The downstream device might then choose an option from the menu and send its choice to the upstream device in the form of a power profile request. At block 540, the upstream device receives the power profile request from the downstream device. At block 550, the upstream device determines whether the request can be honored. If the request cannot be honored, the upstream device might optionally send the profile list to the downstream device again. The upstream device might then receive another power profile request from the downstream device. If the request can be honored, the upstream device, at block 560, sets up a power profile that conforms with the power profile selected by the downstream device.

In an embodiment, when power is being supplied on a traditional data line on a USB-type cable, data might also be provided on that traditional data line. In some cases, data and power might be provided on a line simultaneously. In other cases, data and power might alternate on a line at specified time intervals.

Additionally, the downstream device might specify a length of time for which a particular power configuration is to be used. For example, the downstream device might request that, for five seconds, the upstream device should configure the power output so that power is sent on all the USB-type cable lines (e.g., High, D+, and D− are set to provide 5 volts at 100 ma and Ground remains neutral). After the 5 seconds, the upstream device may reset all the USB-type cable lines to their traditional operating modes and reinitiate the handshake. At that point, the downstream device may request the same or a different power output. For example, the downstream device might then request that High, D+, and D− be set to provide 3.3 volts at 100 ma. In this way, the downstream device can use all of the USB cable lines for power and also vary the output of that power.

Figure 6:
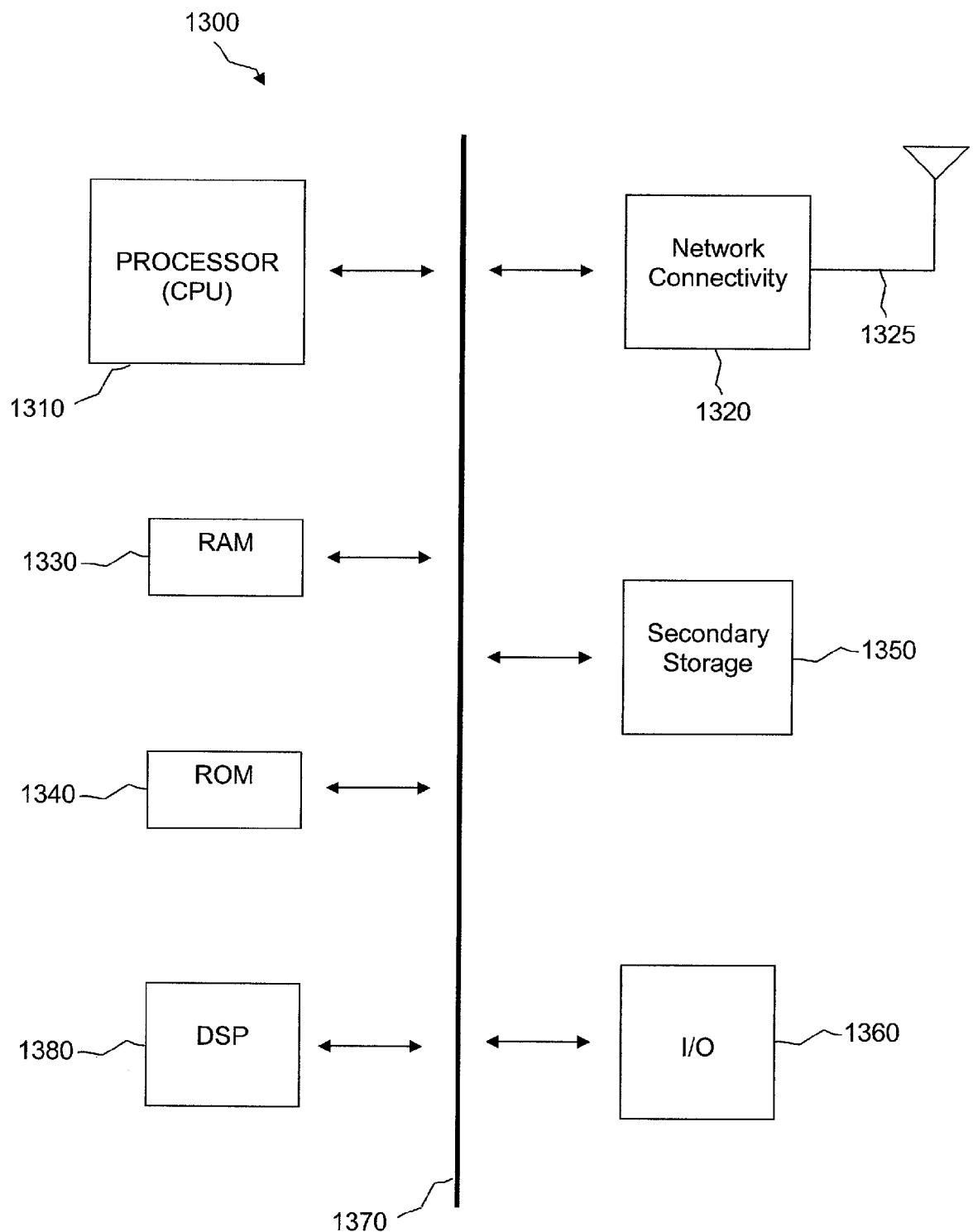
FIG. 6 illustrates a processor and related components suitable for implementing the several embodiments of the present disclosure.

The devices described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for an upstream device to configure a plurality of lines in a cable. The method comprises the upstream device placing a first voltage on a first one of the lines traditionally specified to supply power; the upstream device grounding a second one of the lines traditionally specified to be a ground line; and the upstream device placing on a third one of the lines traditionally specified to convey data a second voltage for supplying power.

In another embodiment, an upstream device is provided. The upstream device includes a processor configured such that the upstream device receives a request from a downstream device for a voltage and current configuration for a plurality of lines in a cable, and configured such that the upstream device provides the requested voltage and current configuration, the voltage and current configuration comprising a first voltage on a first line of the plurality of lines, the first line traditionally specified to supply power; a ground level on a second line of the plurality of lines, the second line traditionally specified to be a ground line; and a second voltage for supplying power on a third line of the plurality of lines, the third line traditionally specified to convey data.

In another embodiment, a method is provided for a downstream device to receive a plurality of voltages on a plurality of lines in a cable. The method comprises the downstream device receiving a first voltage on a first one of the lines traditionally specified to supply power; the downstream device regarding as a ground line a second one of the lines traditionally specified to be a ground line; and the downstream device receiving on a third one of the lines traditionally specified to convey data a second voltage for supplying power.

In another embodiment, a downstream device is provided. The downstream device includes a processor configured such that the downstream device requests a voltage and current configuration for a plurality of lines in a cable, and configured such that the downstream device receives the requested voltage and current configuration from an upstream device, the voltage and current configuration comprising a first voltage on a first line of the plurality of lines, the first line traditionally specified to supply power; a ground level on a second line of the plurality of lines, the second line traditionally specified to be a ground line; and a second voltage for supplying power on a third line of the plurality of lines, the third line traditionally specified to convey data.

In another embodiment, a device is provided. The device includes a processor configured such that the device dynamically configures at least four lines in a cable to convey either data or power.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for an upstream device to configure a plurality of lines in a cable, the method comprising:
    the upstream device placing a first voltage on a first one of the lines, the first one of the lines traditionally specified to supply power;
    the upstream device grounding a second one of the lines, the second one of the lines traditionally specified to be a ground line;
    the upstream device receiving a request from a downstream device for a second voltage, the second voltage for supplying power, on a third one of the lines, the third one of the lines traditionally specified to convey data; and
    the upstream device placing on the third one of the lines the second voltage for supplying power.

2. The method of claim 1, wherein the voltage on the third line is the same as the voltage on the first line.

3. The method of claim 1, wherein the voltage on the third line is different from the voltage on the first line.

4. The method of claim 1, wherein the voltage on the third line is of a different polarity from the voltage on the first line.

5. The method of claim 1, wherein a fourth one of the lines traditionally specified to convey data is at least one of:
    configured to be grounded;
    configured to be at a voltage different from the voltage on the third line; and
    configured to convey data.

6. The method of claim 1, wherein the upstream device receives a request from the downstream device for a current configuration for the third line, and the upstream device provides the requested current configuration.

7. The method of claim 6, wherein the request from the downstream device includes a specification of a length of time for which the current configuration is to remain valid.

8. The method of claim 7, further comprising the upstream device reconfiguring the third line to convey data after the length of time expires.

9. The method of claim 1, wherein the upstream device provides a downstream device with a plurality of options for a voltage and current configuration of the third line, the upstream device receives a selection of one of the options, and the upstream device provides the selected configuration.

10. The method of claim 1, wherein the upstream device provides data and power on the third line in at least one of:
a simultaneous manner; and
an alternating manner.

11. The method of claim 1, wherein the cable is a USB-type cable.

12. An upstream device, comprising:
a processor configured such that the upstream device receives a request from a downstream device for a voltage and current configuration for a plurality of lines in a cable, and configured such that the upstream device provides the requested voltage and current configuration, the voltage and current configuration comprising a first voltage on a first line of the plurality of lines, the first line traditionally specified to supply power; a ground level on a second line of the plurality of lines, the second line traditionally specified to be a ground line; and a second voltage for supplying power on a third line of the plurality of lines, the third line traditionally specified to convey data.

13. The upstream device of claim 12, wherein the voltage on the third line is the same as the voltage on the first line.

14. The upstream device of claim 12, wherein the voltage on the third line is different from the voltage on the first line.

15. The upstream device of claim 12, wherein the voltage on the third line is of a different polarity from the voltage on the first line.

16. The upstream device of claim 12, wherein the upstream device configures a fourth line of the plurality of lines, the fourth line traditionally specified to convey data, to be at least one of:
a ground line;
a voltage-carrying line; and
a data-carrying line.

17. The upstream device of claim 12, wherein the request from the downstream device includes a specification of a length of time for which the voltage and current configuration is to remain valid.

18. The upstream device of claim 17, wherein the upstream device reconfigures the third line to convey data after the length of time expires.

19. The upstream device of claim 12, wherein the upstream device provides a downstream device with a plurality of options for the voltage and current configuration of the third line, the upstream device receives a selection of one of the options, and the upstream device provides the selected configuration.

20. The upstream device of claim 12, wherein the upstream device provides data and power on the third line in at least one of:
a simultaneous manner; and
an alternating manner.

21. The upstream device of claim 12, wherein the cable is a USB-type cable.

22. A method for a downstream device to receive a plurality of voltages on a plurality of lines in a cable, the method comprising:
the downstream device receiving a first voltage on a first one of the lines, the first one of the lines traditionally specified to supply power;
the downstream device regarding as a ground line a second one of the lines, the second one of the lines traditionally specified to be a ground line;
the downstream device sending a request to an upstream device for a second voltage, the second voltage for supplying power, on a third one of the lines, the third one of the lines traditionally specified to convey data; and
the downstream device receiving on the third one of the lines the second voltage.

23. The method of claim 22, wherein the voltage on the third line is the same as the voltage on the first line.

24. The method of claim 22, wherein the voltage on the third line is different from the voltage on the first line.

25. The method of claim 22, wherein the voltage on the third line is of a different polarity from the voltage on the first line.

26. The method of claim 22, wherein a fourth one of lines traditionally specified to convey data is at least one of:
configured to be grounded;
configured to be at a voltage different from the voltage on the third line; and
configured to convey data.

27. The method of claim 22, wherein the downstream device requests a current configuration for the third line and the downstream device receives the requested current configuration from the upstream device.

28. The method of claim 27, wherein the downstream device requests the current configuration, wherein the current configuration occurs for a specified length of time.

29. The method of claim 28, wherein the third line is reconfigured to convey data after the length of time expires.

30. The method of claim 22, wherein the downstream device receives from the upstream device a plurality of options for a voltage and current configuration, the downstream device selects one of the options, the downstream device informs the upstream device of the selection, and the downstream device receives the selected configuration from the upstream device.

31. The method of claim 22, wherein the downstream device receives data and power on the third line in at least one of:
a simultaneous manner; and
an alternating manner.

32. The method of claim 22, wherein the cable is a USB-type cable.

33. A downstream device, comprising:
a processor configured such that the downstream device requests a voltage and current configuration for a plurality of lines in a cable, and configured such that the downstream device receives the requested voltage and current configuration from an upstream device, the voltage and current configuration comprising a first voltage on a first line of the plurality of lines, the first line traditionally specified to supply power; a ground level on a second line of the plurality of lines, the second line traditionally specified to be a ground line; and a second voltage for supplying power on a third line of the plurality of lines, the third line traditionally specified to convey data.

34. The downstream device of claim 33, wherein the voltage on the third line is the same as the voltage on the first line.

35. The downstream device of claim 33, wherein the voltage on the third line is different from the voltage on the first line.

36. The downstream device of claim 33, wherein the voltage on the third line is of a different polarity from the voltage on the first line.

37. The downstream device of claim 33, wherein a fourth line of the plurality of lines, the fourth line traditionally specified to convey data, is at least one of:
configured to be grounded;

configured to be at a voltage different from the voltage on the third line; and configured to convey data.

38. The downstream device of claim 33, wherein the downstream device requests the voltage and current configuration, wherein the voltage and current configuration occurs for a specified length of time.

39. The downstream device of claim 38, wherein the third line is reconfigured to convey data after the length of time expires.

40. The downstream device of claim 33, wherein the downstream device receives from an upstream device a plurality of options for the voltage and current configuration, the downstream device selects one of the options, the downstream device informs the upstream device of the selection, and the downstream device receives the selected configuration from the upstream device.

41. The downstream device of claim 33, wherein the downstream device receives data and power on the third line in at least one of:

a simultaneous manner; and an alternating manner.

42. The downstream device of claim 33, wherein the cable is a USB-type cable.

\* \* \* \* \*